Sept. 9, 1952         A. J. KRONQUIST         2,609,849
              PORTABLE MORTIS CUTTING TOOL
              Original Filed April 2, 1947
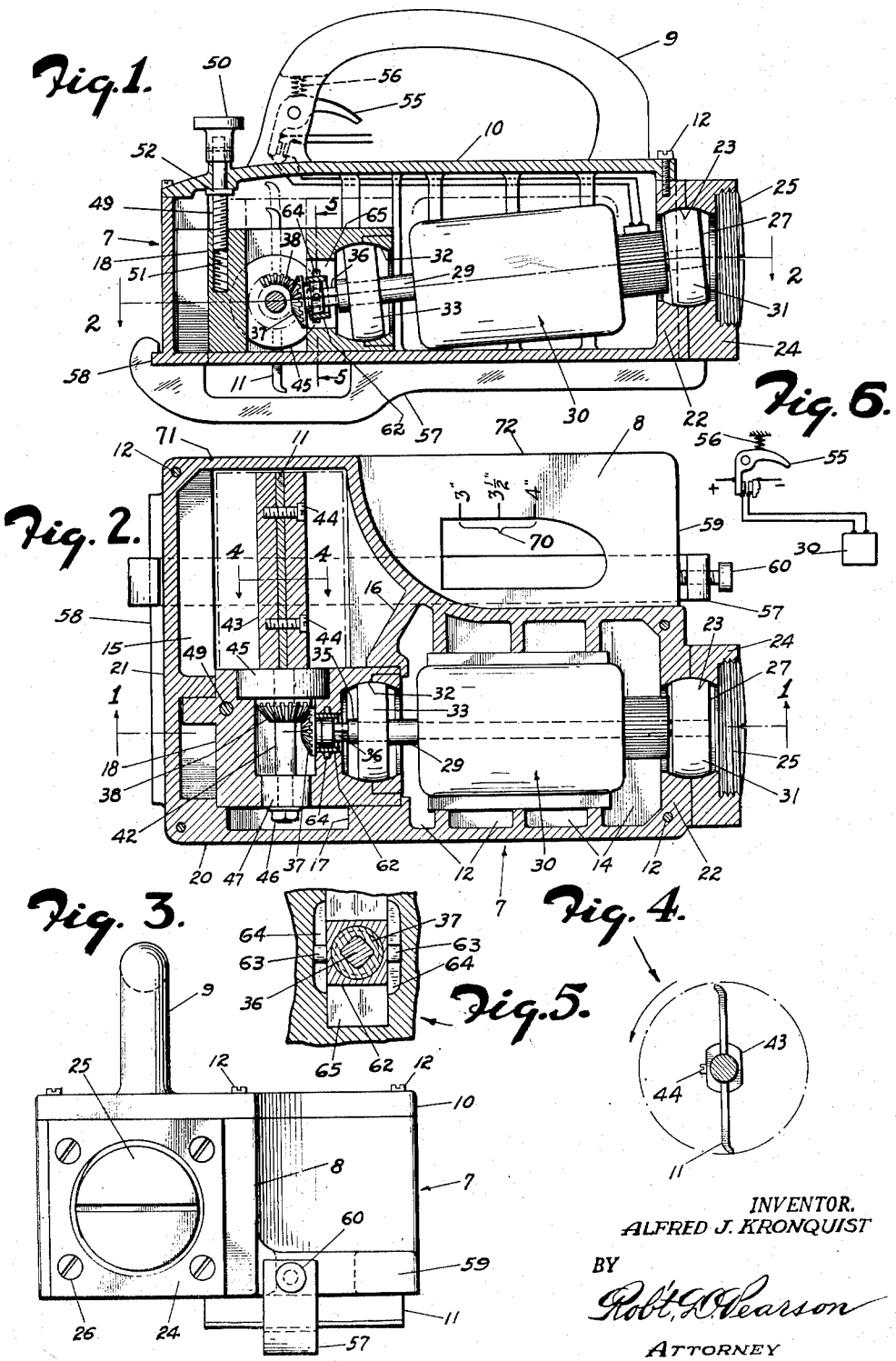
INVENTOR.
ALFRED J. KRONQUIST
BY
Robt. G. Pearson
ATTORNEY Patented Sept. 9, 1952

2,609,849

UNITED STATES PATENT OFFICE 2,609,849

PORTABLE MORTIS CUTTING TOOL

Alfred J. Kronquist, Los Angeles, Calif.

Substituted for application Serial No. 738,961, April 2, 1947. This application May 21, 1951, Serial No. 227,560

4 Claims. (Cl. 144—83)

This application is a substitute for application Serial No. 738,961 filed April 2, 1947.

This invention pertains to a motor driven manually portable mortis cutter, of the type wherein a handle-carrying casing contains a motor and also a driving connection for a cutter, which cutter is also mounted directly upon said casing.

An object of the invention is to provide for mounting a rotatable cutter blade in a more advantageous position upon the portable casing which carries it, so that safety will be provided for by exposing only a relatively small part of the cutter's edge, and yet the cutter will be so positioned that it may readily be applied to the work to cut thereinto to the desired extent and in the desired directions.

Another object is to provide an improved movable housing means both for the motor and the cutter whereby the extent to which the cutter projects from the casing during operation may be more satisfactorily controlled.

Other objects, advantages and features of invention will hereinafter appear.

Referring to the accompanying drawing, which illustrates a preferred embodiment of the invention, Fig. 1 is a side elevation, parts being sectioned on line 1—1 of Fig. 2.

Fig. 2 is a section on line 2—2 of Fig. 1.

Fig. 3 is an elevation looking at the right hand end of Fig. 2.

Fig. 4 is a section on line 4—4 of Fig. 2.

Fig. 5 is a section on line 5—5 of Fig. 1.

Fig. 6 is an electrical wiring diagram, including a diagrammatical showing of the manually operable switch for starting and stopping the motor.

Referring in detail to the drawing, the casing 7 is of a generally quadrilateral shape except that it has a cut-away corner portion 8. The handle 9 is carried by a cover plate 10, and by its use the operator may bodily vary the position of the entire tool in the application of the cutter 11 thereof to the work.

Said cover 10 is attached to the casing by fastening means 12 in an overlying relation to an interior space consisting of a motor chamber 14 and a cutter mechanism chamber 15, which chambers are partially separated by inward extensions 16 and 17 of the casing wall, said chamber 15 occupying a corner portion of the casing.

A large cavitated bearing block 18 is held in place within the cutter chamber 15 by means of said wall portions 16 and 17 and the corner portions of the casing walls 20 and 21, said block being thus supported to slide vertically (as viewed in Fig. 1) while held against horizontal movement.

As viewed in Figs. 1 and 2 the casing has a thickened end wall portion 22 provided with a large circular aperture 23 which aperture is continued through a cap ring 24, said ring in turn having screwed into it a plug 25 which closes the aperture thereof, the ring 24 being attached by means of cap screws 26. Said passage 23 is spherically outcurved or bulged in such a manner as to provide a suitable bearing surface for a bearing head 27 carried by a projecting end portion of the shaft 29 of the motor 30, said head 27 being shaped as a spherical body truncated at each end. To reduce the rotational friction of the motor shaft a ball bearing structure 31 is provided so that a bearing means is provided for both rotational and lateral movement of the motor shaft.

Continuing with the description of the parts within the slide bearing block 18, that end portion of said block which is nearest to the motor contains a bearing cavity 32 shaped as a truncated sphere so as to have movably fitted within it a bearing head 33 shaped like the already described bearing head 27. This arrangement is provided in order to permit the bearing block 18 to be moved as indicated by dotted lines in Fig. 1 without interfering with the operation of the motor. The motor shaft 29 is extended beyond the bearing block 33, thus the extended part 35 carries a guide means 36 for a bevel pinion gear 37 attached to the extremity of the extended motor shaft. Said gear 37 meshes continually with the cutter driving gear 38, the just mentioned guide means being provided to insure proper continuous meshing of said gears.

The cutter gear 38 is secured to the cutter shaft 42, said shaft having in turn secured to it an elongated two-part cutter head 43, the two parts of which are secured together by means of countersunk screws 44 which pass through the cutter blade 11. Said cutter shaft 42 is surrounded by a ball bearing structure 45 fitted into a recess provided for it in one side of the large bearing block 18, said shaft 42 extending through said bearing block and projecting therebeyond, its projecting portion having attached to it a nut 46, adjacent to said nut the block 18 contains a ball bearing 47 which surrounds said shaft.

The adjustment of the large bearing block 18 is effected by means of a screw threaded stem 49 carrying a head 50 externally of the casing. The screw threaded part of the stem operated bore 51 is tapped into the upper side portion of the block 18. A collar 52 carried by the stem 49 cooperates with the head 50 to prevent longitudinal movement of the stem during its rotational adjustment.

A switch trigger 55 is carried internally by the handle 9 to be manually moved to switch into a closing position against the opposition of the trigger spring 56.

In the operation of the tool the workman will grasp the handle 9, and block 18 being adjusted to the position shown in Figs. 1 and 2, and after raising the trigger 55 to turn on the current to turn on the motor and rotate the cutter, will so position the casing as to bring the projecting edge portion of the cutter into engagement with the work.

An adjustable guide member 57 is secured to the casing to travel along the track member 58 and 59, said guide being held in the desired position by set screw 60.

The cut-away portion 8 is constructed with a straight-edge runner 72 to provide a guide means when it is being used for mortising for door and window hinges, and the graduations 70 can be used to measure the cut-out length in the work, as measured from the gauge mark 71.

The gear 37 is carried by a slide-block 62 which block operates in its slide bearing 65, and as the block 62 is moved its trunnions 63 will slide in a related line (with the movement of said gear 38) in their slide grooves 65, thus holding the proper mesh clearance between the teeth of said gears 37 and 38 at any adjusted position of said cutter 11.

This portable mortising tool will be used to mortis doors and windows for conventional hinges to be inserted and secured therein in combination with their frames, thus for my primary object of my invention is to provide a new and useful portable door and window hinge mortiser for conventional type hinges to be inserted and secured therein in combination with the frame.

I claim:

1. In a manually portable cutting tool having a rotary cutter and a motor therefor; a housing for said cutter and said motor, said motor including a drive shaft projecting from one end thereof rotatable about a generally horizontally extending axis coincident with that of the motor, a horizontally extending cutter shaft on which said cutter is secured extending past one end of said drive shaft at right angles to the latter, a bearing carried by said housing at the end of said motor opposite said drive shaft supporting said motor for vertical swinging about a horizontal axis extending through said axis of said motor and drive shaft, a block within said housing, guides carried by said housing supporting said block for vertical movement relative to said housing, bearings for said cutter shaft and said drive shaft carried by said block for vertical movement therewith, interengaging gears respectively on said cutter shaft and said drive shaft, an adjusting screw carried by said housing and connected with said block for raising and lowering said block upon rotation of said screw in one direction or the other.

2. In a manually portable cutting tool having a rotary cutter and a motor therefor; a housing for said cutter and said motor, said motor including a drive shaft projecting from one end thereof rotatable about a generally horizontally extending axis coincident with that of the motor, a horizontally extending cutter shaft on which said cutter is secured extending past one end of said drive shaft at right angles to the latter, a bearing carried by said housing at the end of said motor opposite said drive shaft supporting said motor for vertical swinging about a horizontal axis extending through said axis of said motor and drive shaft, a block within said housing, guides carried by said housing supporting said block for vertical movement relative to said housing, bearings for said cutter shaft and said drive shaft carried by said block for vertical movement therewith, interengaging gears respectively on said cutter shaft and said drive shaft, an adjusting screw carried by said housing and connected with said block for raising and lowering said block upon rotation of said screw in one direction or the other, the bearing for said drive shaft being coaxial with the latter at all times during its vertical movement with said drive shaft, and said block and bearing being formed with complementary spherical slidably engaging surfaces permitting relative movement between said last mentioned bearing and said block during said vertical movement of said block.

3. In a manually portable cutting tool having a rotary cutter and a motor therefor; a housing, a partition within said housing dividing the latter into a motor compartment in which said motor is positioned and a cutter compartment within which said cutter is positioned, said partition including a bearing block, a cutter shaft on which said cutter is secured, bearings carried by said block respectively supporting one end of said motor and said shaft, said motor including a drive shaft, interengaging gears connecting said drive shaft with said cutter shaft, a bottom wall on said housing, closing the lower side thereof, guide members within said housing rigid therewith supporting said bearing block for movement toward and away from said bottom wall, said bottom wall being formed with an opening for said cutter, and a bearing on said housing supporting the end thereof opposite said one end for swinging of the said one end of said motor toward and away from said bottom wall, an adjusting member on said housing connected with said block for moving said block toward and away from said bottom.

4. In a manually portable cutting tool having a rotary cutter and a motor therefor having a drive shaft; a horizontally elongated housing inclosing said motor with said drive shaft extending longitudinally thereof, a horizontal cutter shaft extending across the end of said drive shaft at right angles thereto said housing including a lateral extension projecting laterally therefrom and into which said cutter shaft projects, said cutter being within said extension and secured on said cutter shaft, interengaging gears respectively on said cutter shaft and on said drive shaft connecting them for driving said cutter shaft by said drive shaft, said cutter including blades projecting below said extension and extending longitudinally of said cutter shaft for engagement with material to be cut, an elongated guide member below said extension extending longitudinally of said housing and transversely of said blades, said guide member being movable transversely of said housing, means supporting said member for such movement and means for securing said member in adjusted position at any point in said movement, a bottom wall on said housing projecting therefrom alongside said extension, said guide member extending below the said extension of said bottom wall, an opening formed in said bottom wall positioned to expose therethrough the work to be cut by said cutter and the portion cut thereby.

ALFRED J. KRONQUIST.

No references cited.